United States Patent [19]

Mori

[11] Patent Number: 4,943,138

[45] Date of Patent: Jul. 24, 1990

[54] COMBINATION OF OPTICAL CONNECTORS AND OPTICAL TERMINAL COVERS

[76] Inventor: Kei Mori, 3-16-3-501, Kaminoge, Setagaya-ku, Tokyo, Japan

[21] Appl. No.: 355,598

[22] Filed: May 22, 1989

[30] Foreign Application Priority Data

Nov. 9, 1988 [JP] Japan .................................. 63-283097

[51] Int. Cl.$^5$ ................................................ G02B 6/36
[52] U.S. Cl. ............................... 350/96.20; 350/96.15; 350/96.10
[58] Field of Search ............... 350/96.20, 96.23, 96.10, 350/96.15, 96.24; 439/564, 565, 573, 574

[56] References Cited

U.S. PATENT DOCUMENTS

| | | | |
|---|---|---|---|
| 1,937,322 | 8/1928 | Johnson | 439/565 X |
| 3,792,284 | 2/1974 | Kaelin | 350/96.20 X |
| 3,803,531 | 4/1974 | Sorensen | 439/565 |
| 4,820,185 | 4/1989 | Moulin | 350/96.21 X |

Primary Examiner—Frank Gonzalez
Assistant Examiner—Phan T. Heartney
Attorney, Agent, or Firm—Jordan and Hamburg

[57] ABSTRACT

A combination of a first-optical connector attached to a light-receiving end of a first fiber optic cable and a second-optical connector attached to a light-emitting end of a second fiber optical cable are connected so as to transmit the light from the second fiber optic cable into the first fiber optic cable. The first optical connector has a first-terminal holder capable of fixing to a relative position of fiber end faces therein and having a face which is even with the optical fiber end-faces and also having at least two locating holes therein. The second connector has a terminal holder capable of fixing a relative position of the light guide end faces therein and having a face being even with the optical fiber end-faces and also having at least two locating pins positioned opposite the corresponding locating holes of the first optical connector.

19 Claims, 4 Drawing Sheets

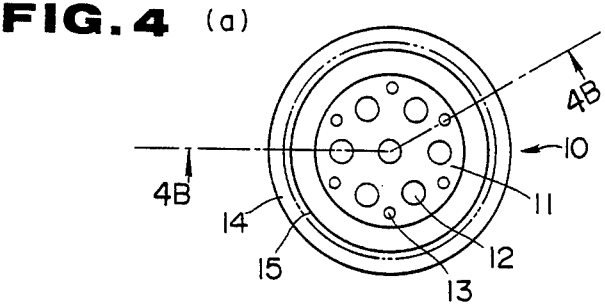
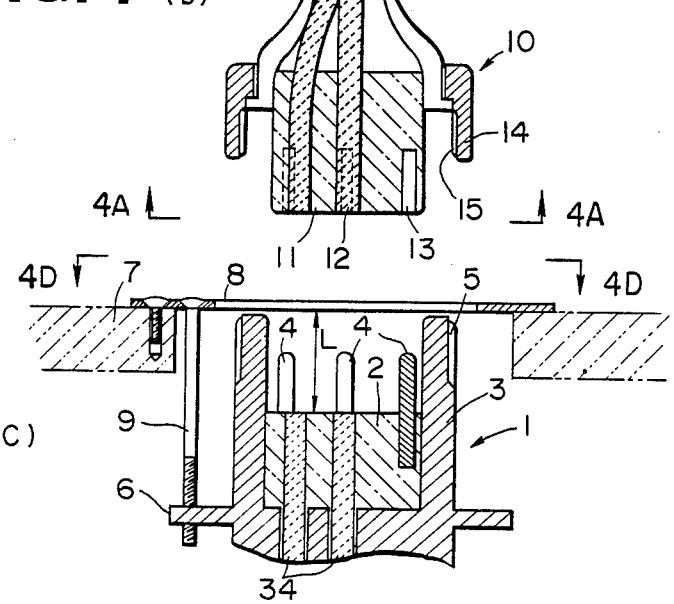
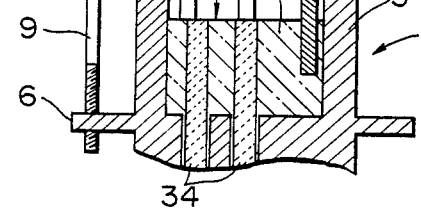
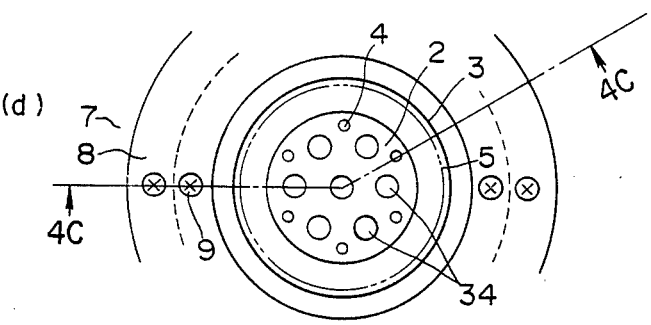

COMBINATION OF OPTICAL CONNECTORS AND OPTICAL TERMINAL COVERS

BACKGROUND OF THE INVENTION

The present invention relates to a combination of optical connectors and optical terminal covers comprising one fiber optic cable for transmitting sunlight therethrough from a solar ray collecting device located on a roof or similar place and having at its light-emitting end an optic connector fixed to a room inside a wall and another fiber optic cable fitted with a light radiator at one end and having an optical connector at another end to be removably connected to the wall optical connector, the optical connector of the light radiator's fiber optic cable being connected to the wall optical connector to radiate light for illuminating the room and, when no light is required, the optical connector of the radiator's cable can be removed from the wall connector and an optical terminal cover is connected to the wall connector so as to stop light emission from the wall optical connector.

The present applicant has previously proposed to focus the sun's rays or artificial light rays by the use of lenses or the like, to guide the same into an optical conductor cable, and to transmit them onto an optional desired place through the optical conductor cable. The light rays transmitted in such a way are employed for use in illumination or for other like purposes as for example to cultivate plants, chlorella or the like. In the process, it has been found that visible light rays not containing therein ultraviolet rays, infrared rays etc. promote a living body reaction, and thereby the same promote the health of persons or prevent people's skin from the appearance of growing old. recovering from arthritis, neuralgia, bedsores, rheumatism, burn scars, skin diseases, injury scars, bone fractures or the like, and of relieving pain from those diseases. Such beneficial effects have been witnessed by the present applicant.

The solar ray collecting device as mentioned above is installed on a roof and the sunlight collected by the device is transmitted through a fiber optic cable into a room wherein the light is used, as for example for sunbathing or for cultivating decorative plants or to nurture tropical fish. It is possible that an optical connector attached to the light-emitting end of the fiber optic cable from the solar ray collecting device can be fixed to the wall of a room and that an optical connector, which is attached to one end of another fiber optic cable, having a light-emitting end at its other end, is connected to the wall connector when the light is being used. This method is especially effective in the case of installing a solar ray collecting and distributing system in a building. Namely, in the course of constructing a building, an optical connector attached to the light-emitting end of a prepared fiber optic cable, being long enough to reach the solar ray collecting device to be installed on the building's roof can be fixed at the desired position of the room wall on the desired floor and the free end of the fiber optic cable can be pulled up as the upper floors are completed. Accordingly, a desired number of optic connectors and fiber optic cables can be installed. Concurrently with the construction work and therefore the raised up cable ends can be connected to the solar ray collecting devices when the building is completed.

SUMMARY OF THE INVENTION

It is an object of the present invention to provide an optical connector which is attached to the light-emitting end of a fiber optic cable from a solar ray collecting device or artificial light source installed on a building's roof and fixed onto a room wall.

It is another object of the present invention to provide an optical connector which is attached to another fiber optic cable having a light-emitting end and connected to the wall optical connector when the light is being used in the room and an optical terminal cover for closing off the wall optical connector when the light is not being used.

BRIEF DESCRIPTION OF THE DRAWINGS

FIGS. 4 are constructional views for explaining an optical connector embodying the present invention;

DESCRIPTION OF THE PREFERRED EMBODIMENTS

Figure 1:
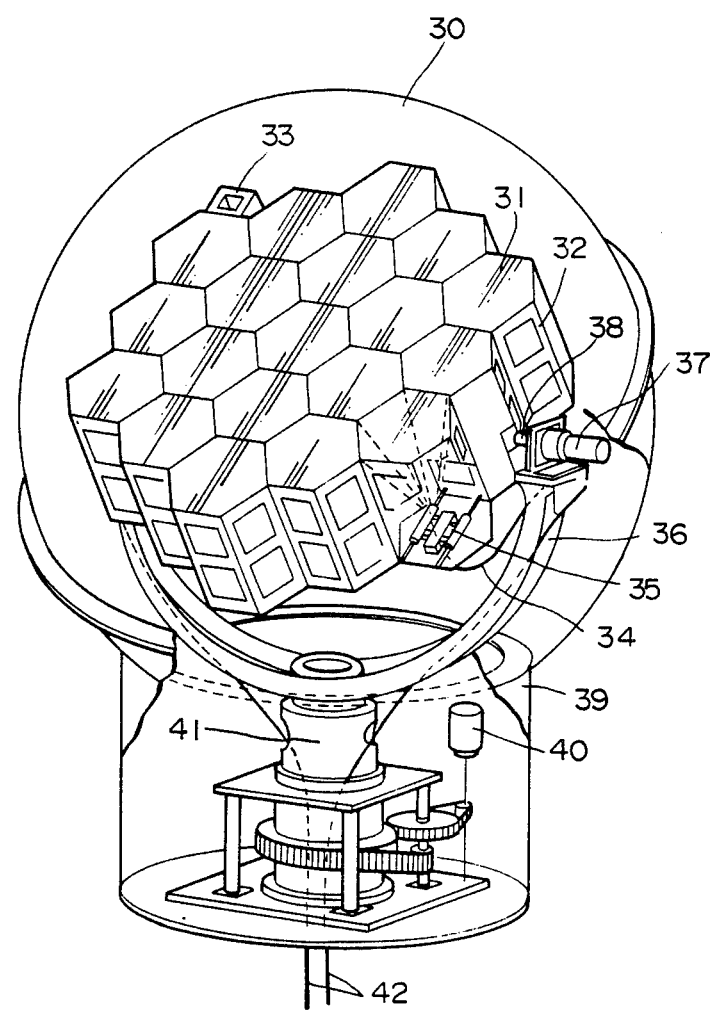
FIG. 1 is a view for explaining an embodiment of a solar ray collecting device previously proposed by the present applicant.

FIG. 1 is a construction view illustrating, by way of example, a solar ray collecting device previously proposed by the present applicant. In FIG. 1, numeral 30 is a transparent protective capsule, 31 is a Fresnel lens, 32 is a lens holder, 34 is a number of optical fibers or a fiber optic cable consisting of a number of optical fibers (herein-after to be called light guide) located on the focal plane of the Fresnel lens, 35 is an optical fiber or fiber optic cable holder, 36 is an arm, 37 is a pulse motor, 38 is a horizontal shaft to be rotated by said pulse motor 37, 39 is a base for mounting the protective capsule 30 thereon, 40 is a pulse motor, 41 is a vertical shaft to be rotated by said pulse motor 40, 42 is a bundle of fiber optic cables 34.

The direction of the sun is detected by means of the solar position sensor 33 and its detection signal which controls the pulse motors 37 and 40 for rotating the horizontal shaft 38 and 41 respectively so as to always direct said solar position sensor 33 toward the sun, and the sunlight focused by each lens 31 is guided into the corresponding light guide 34 through its end surface set at the focal point of said lens. The light guides 34, with their end faces placed at the corresponding lens focal planes, are bundled together in a fiber optic cable 42 which is led out from the solar ray collecting device and laid any place where the light is needed for illumination, cultivation of plans, nurturing animals, for sunbathing etc.

Figure 2:
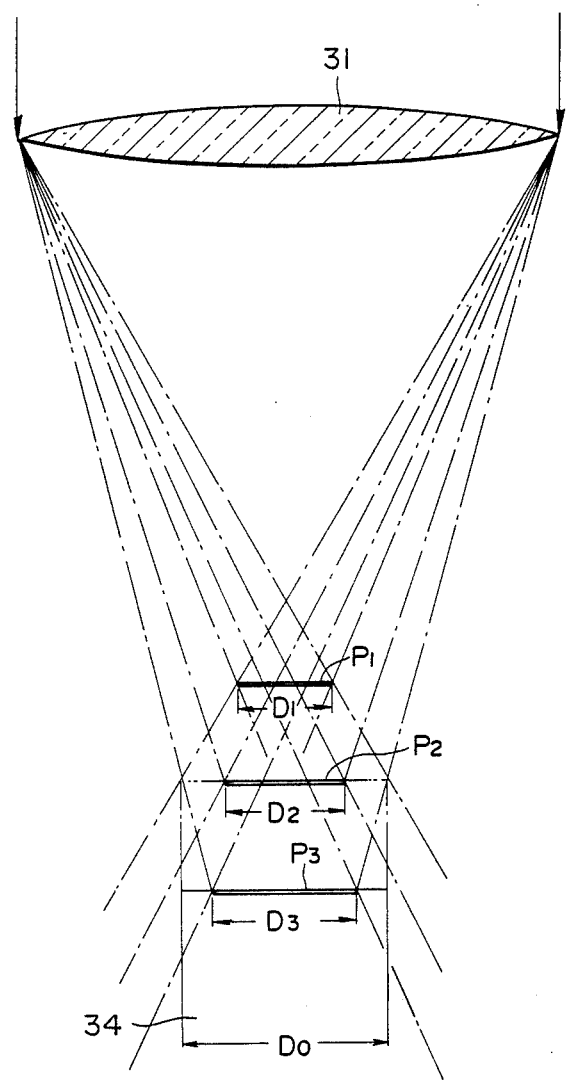
FIGS. 2 and 3 are views for explaining a principal of guiding the sunlight into a fiber optic cable.

FIG. 2 is a view for explaining how to guide the light rays collected by the lens 31 into the light guide.

Figure 3:
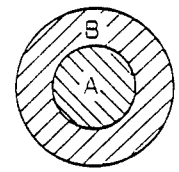

In FIG. 2, 31 is a Fresnel lens or the like and 34 is a light guide for receiving the sunlight focused by said lens and transmitting the same there-through to any desired place. In the case of focusing the sunlight through the lens system, the solar image, as shown in FIG. 3, has a central portion A consisting of almost white light and a circumferential portion B containing therein a large amount of the light components having wave-lengths corresponding to the focal point of the lens system. Namely, in the case of focusing sunlight through the lens system, the focal point and the size of the solar image will vary in accordance with the component wave-lengths of the light. For instance, the blue color light having a short wave-length makes a solar image of diameter D1 at position P1. Furthermore, the green color light makes a solar image of diameter D2 at position P2 and the red color light makes a solar image of diameter D3 at position P3.

Consequently, as shown in FIG. 2, when the light-receiving end-surface of the light guide is set at position P1, it is possible to collect sunlight containing plenty of blue color components at the circumferential portion thereof. When the light-receiving end-surface of the light guide is set at position P2, it is possible to collect sunlight containing plenty of green color components at the circumferential portion thereof. When the light-receiving end-surface of the light guide is set at position P3 it is possible to collect sunlight containing plenty of red color components at the circumferential portion thereof. In each case, the diameter of the light guided can be selected in accordance with the light components to be collected. For instance, the required diameters of the light guides are D1, D2 and D3, respectively, depending on the colors of the light rays to desired, i.e. the blue, green and red colors. In such a way, the required amount of the fiber optic cable can be saved and thereby the sunlight containing therein plenty of the desired color components can be collected most effectively.

And further, as shown in FIG. 2, if the diameter of the light-receiving end-surface of the fiber optic cable is enlarged to D0, it may be possible to collect light containing therein all of the visible wavelength components, but not containing ultraviolet rays and infrared rays.

It is also possible that the light-receiving surfaces of the light guides 34 are fixed at the focal plane of the lens system beforehand by a manufacturer or said light-receiving surfaces of the light guides are adjustable in the light axis direction of the lens system and regulated by the user to a desired point so as to obtain the desired colored light.

As mentioned above, when the sunlight is focused through a lens system, the solar image has a central portion A full of white color light and a circumferential portion B, the content of which varies depending upon the distance from the lens system. Namely, at a short distance from the lens system blue color light is gathered in portion B and at a large distance from the lens system red color light is gathered in portion B. By adjusting the set position of the light-receiving faces of the light guides it is possible to eliminate infrared and ultraviolet rays from the sunlight and thus obtain sunlight that is suitable for sunbathing and for cultivating animals and plants.

Let us suppose that the above-mentioned solar ray collecting device is installed on a roof and the sunlight collected by the device is transmitted through a fiber optic cable into a room wherein the light is used, as for example for sunbathing or for cultivating decorative plants or to nurture tropical fish. It is possible that an optical connector attached to the light-emitting end of the fiber optic cable from the solar ray collecting device can be fixed to the wall of a room and that an optical connector, which is attached to one end of another fiber optic cable, having a light-emitting end at its other end, is connected to the wall connector when the light is being used. This method is especially effective in the case of installing a solar ray collecting and distributing system in a building. Namely, in the course of constructing a building, an optical connector attached to the light-emitting end of a prepared fiber optic cable, being long enough to reach the solar ray collecting device to be installed on the building's roof can be fixed at the desired position of the room wall on the desired floor and the free end of the fiber optic cable can be pulled up as the upper floors are completed. Accordingly, a desired number of optic connectors and fiber optic cables can be installed. Concurrently with the construction work and therefore the raised up cable ends can be connected to the solar ray collecting devices when the building is completed.

In view of the foregoing, the present invention was made in order to provide the combination of: 1. an optical connector which is attached to the light-emitting end of a fiber optic cable from a solar ray collecting device or artificial light source installed on a building's roof and fixed onto a room wall, 2. an optical connector which is attached to another fiber optic cable having a light-emitting end and connected to the wall optical connector when the light is being used in the room and an optical terminal cover for closing off the wall optical connector when the light is not being used.

FIG. 4 is a construction view for explaining an embodiment of the present invention. In FIG. 4, numeral 1 is an optical connector attached to the end of a fiber optic cable shown in FIG. 4, 10 is an optical connector which is attached to the end of a fiber optic cable and which can be removably connected to another optic connector 1. The fiber optic cable, fitted with the optical connector 10, has a light-emitting head at its other end not shown in FIG. 4. The light emitted from the light-emitting head can be used for sunbathing, cultivating decorative plants or to nurture tropical fish. FIG. 4(a) is a view shown from the plane 4A—4A of FIG. 4(b), FIG. 4(b) is a section taken along line 4B—4B of FIG. 4(a), FIG. 4(c) is a section taken along line of 4C—4C of FIG. 4(d) and FIG. 4(d) is a view shown from the plane 4D—4D of FIG. 4(c). The optical connectors 1 and 10 are coupled with each other just like a plug and a socket is used for the electric connection. The optical connector 1 is fixed on the wall of a room and the optical connector 10 is attached to the end of a movable fiber optic cable which is connected to the wall optical connector 1 when the light is being used.

The optical connector 1 has a terminal holder 2 for fixing therein several light guides (seven light guides are shown but that does not indicate the limit) of the fiber optic, cable 34 and a connecting ring 3 for outwardly fixing the terminal holder 2. The terminal holder 2 is provided with a plurality of locating pins 4 thereon and the connecting ring 3 has an outer thread 5 for engaging the cap nut of the optical connector 10 and is also provided with a collar 6 for fixing the optical connector to a wall's surface. Numeral 7 designates a wall surface and numeral 8 designates a fitting.

As shown in FIG. 4(c), the optical connector 1 is fixed by the use of screws 9 to the fitting 8 secured on the wall surface 7. The optical connector 10 includes therein a terminal holder 11 and has a cap nut 14 outwardly mounted to the terminal holder 11.

The terminal holder 11 holds therein light guides 12 and locating holes 13 arranged so as to meet respectively with the light guides 34 and the locating pins 4 of the optical connector 1. The cap nut 14 has an internal thread 15 for engaging the threaded part 5 provided on the connecting ring of the optical connector 1. Consequently, by fitting the optical connector 10 onto the wall optical connector 1 so as to insert the locating pins 4 of the latter into the corresponding holes 13 of the former and then by screwing cap nut 14 onto the threaded part 5 of the optical connector 1 both optical connectors 1 and 10 are correctly connected with each other, that is, the light guides 34 and 12 correctly match each other assuring the effective transmission of the light therethrough.

Increasing the number of locating pins will reduce the danger of fire caused by children stuffing scraps of paper into the light-emitting end of the wall optical connector 10 when not in use.

A safe distance L between the light-emitting end and the wall surface is also provided by using the locating pins 4.

Figure 5A:
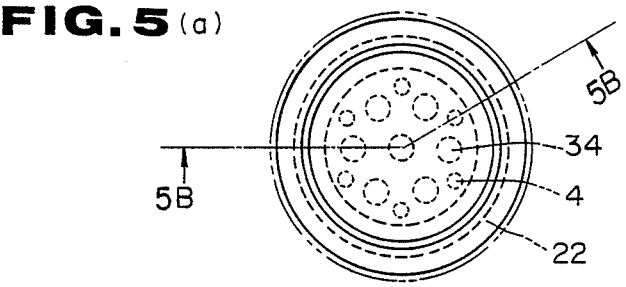
FIGS. 5 and 6 are views for explaining respectively optical terminal covers embodying the present invention.
Figure 5B:
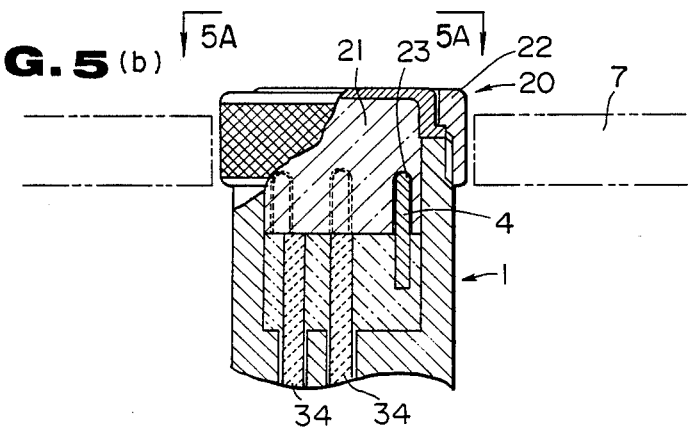

FIG. 5 is a view for explaining an optical terminal cover for preventing the light from emitting from the wall optical connector 1 when it is not needed. FIG. 5(a) is a view shown along the arrow lines 5A—5A of FIG. 5(b). FIG. 5(b) is a section of taken along 5B—5B of FIG. 5(a). This sectional view shows a terminal cover 20 mounted on the optical connector 1. The terminal cover 20 is similar to the optical connector 10 shown in FIG. 4 except that the cover has no light guides therein. The terminal cover is provided with a cap nut 22 and a terminal member 21 wherein holes 23 are arranged so as to fit therein the locating pins 4 of the optical connector 1. The terminal member 21 of the terminal cover can be closely fitted to the terminal holder of the wall optical connector 1 by inserting locating pins 4 into the corresponding holes 23 and then by screwing the cap nut 22 in such a way as shown in FIG. 5. The light transmitted through the fiber optic cable 34 is reflected upon the surface of the terminal member 21 and the reflected light is returned into the same fiber optic cable 34. The surface of the terminal member is finished as a reflecting mirror.

Figure 6:
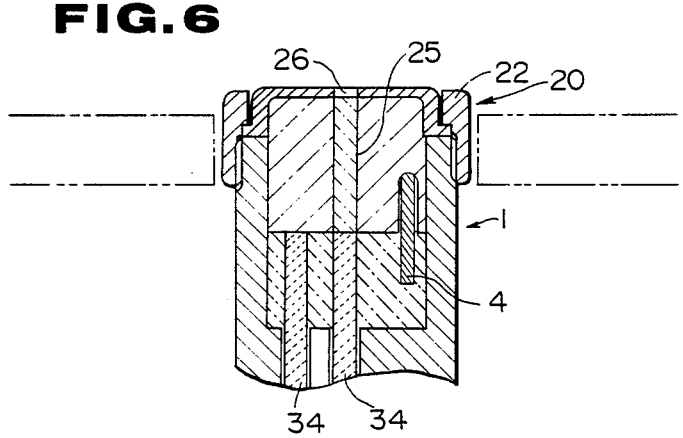

FIG. 6 is a view for explaining an improved optical terminal cover shown in FIG. 5. As shown in FIG. 6, this terminal cover has a through-hole 25 which matches at least one of the light guides 34 of the optical connector 1 and which accommodates therein a semi-transmissive material such as an optical filter, an optical attenuating member, a half-mirror etc. This makes it possible to know whether the light is being transmitted through the fiber optic cable 34 with no need to check weather conditions out side.

The optical terminal cover 10 or 20 may be chained to the wall to protect the loss of it.

In the above-mentioned embodiment, the light is collected by the solar ray collecting device and transmitted through the fiber optic cable into the room wherein the light is used. In addition, it is also possible to introduce the artificial light from an artificial light source into some of fiber optic cables of the system for the purpose of using the artificial light when the sunlight can not be obtained, for instance, in cloudy day and at night.

As is apparent from the foregoing description, according to the present invention, it may be possible to provide a combination of optical connectors and optical terminal covers, which is capable of fixing a light-emitting end of the fiber optic cable at a wall of a room wherein the light is required and making it makes it possible to easily and effectively use the light delivered through the cable and also effectively to return back the light into the cable when the no light is desired.

The optical connectors 1 and 10 and the optical terminal cover 20 must be always kept clean of their surfaces and therefore they have to be cleaned at the proper time. In this case, all of connectors and covers according to the present invention, since they include no electric circuit and connection, can be easily cleaned out in a ultrasonic cleaning bath. Especially, the optical connector 1, after the screws 9 have been removed, can be pulled out together with the fiber optic cable from the wall recess and be cleaned without disconnecting it from the cable.

It is of great advantage to adopt the connector system in installing the solar ray collecting system in the building. Namely, in course of raising higher a building an optical connector attached to a light emitting end of a prepared fiber optic cable having a length enough to reach the solar ray collecting device to be installed on the building's roof can be fixed at desired position of the room wall at the desired floor and then the free end of the fiber optic cable can be raised up as the upper floors are built up. Accordingly, a desired number of optic connectors and fiber optic cables can be installed at the same time with construction work and therefore the raised up cables' ends can be connected to the solar ray collecting devices as soon as the building is completed.

I claim:

1. Connectors for connecting fiber optical cables comprising a first fiber optic cable having a light-emitting end portion which includes a plurality of first light guides each having a light-emitting end, a second fiber optic cable having a light-receiving end portion which includes a plurality of second light guides each having a light-receiving end, a first optical connector means and a second optical connector means, said first optical connector means comprising a first terminal holder having a front face, said first terminal holder having a plurality of spaced openings for receiving said first light guides such that said light-emitting ends are flush with said front face, said second optical connector means comprising a second terminal holder having a plurality of spaced openings for receiving said second light guides such that said light-receiving ends are flush with said front face of said second terminal holder, locating means on said first and second terminal holders for locating said first and second terminal holders in a coupling position in which said light-emitting ends are aligned with respective light-receiving ends, said locating means comprising projection means on one of said first and second terminal holders and recess means in the other of said first and second terminal holders, said recess means receiving said projection means when said first and second terminal holders are in said coupling position, and connector ring means mounting each of said first and second terminal holders and operable to be detachably connected to thereby detachably retain said first and second terminal holders in said coupling position in which light rays are transmitted from said light-emitting ends of said first light guides to said aligned light-receiving ends of said second light guides.

2. Connectors according to claim 1, wherein said light-emitting ends and said light-receiving ends are in abutting relationship when said first and second terminal holders are in said coupling position.

3. Connectors according to claim 1, wherein said connector ring means comprises a first connector ring disposed about said first terminal holder and a second connector ring disposed about said second terminal holder, said first and second connector rings each having thread means for detachably fastening said first and second connector rings to each other.

4. Connectors according to claim 3, wherein said first and second optic cables are installed in a building structure, and further comprising structure-mounting means mounting said first connector ring on said building structure.

5. Connectors according to claim 3, wherein said first terminal holder has a bottom face opposite said front face of said first terminal holder, said first connector ring having a channel with side walls and a bottom wall, said first terminal holder being disposed in said channel such that said bottom face abuts said bottom wall of said channel, said channel having a length greater than the length of said first connector ring so as to define a space in said channel juxtaposed to said front face of said first terminal holder, said projection means comprising pins mounted on said first terminal holder and extending into said space.

6. Connectors according to claim 5, wherein said second terminal holder is disposed in said space when said first and second terminal holders are in said coupled position.

7. Connectors according to claim 5, wherein said recess means are disposed in said second terminal holder, said recess means receiving said pins when said first and second terminal holders are in said coupled position.

8. Connectors according to claim 5, wherein said second terminal holder has a front end portion juxtaposed to said front face of said second terminal holder, said front end portion being received in said channel with said front face of said second terminal holder abutting said front face of said first terminal holder when said first and second terminal holders are in said coupled position.

9. Connectors according to claim 1 further comprising cover means for preventing unneeded light from emitting from said light-emitting ends of said second light guides, said cover means comprising a cover member disposed over and covering said front face of said first terminal holder in a covering position to prevent light rays from emitting from said light-emitting ends of said second light guides, and retaining means operably engaged between said cover member and said connector ring means for detachably retaining said cover member in said covering position.

10. Connectors according to claim 9, wherein said cover means has reflecting means for reflecting light rays back into said first optic cable.

11. Connectors according to claim 9, wherein said projection means comprises pins extending from said front face of said first terminal holder, said cover member having openings for receiving said pins when said cover member is in said covering position.

12. Connectors according to claim 9, wherein said connector ring means comprises a connector ring having a channel which has a bottom wall, said first terminal holder being disposed on said channel in contact with said bottom wall, said cover member being disposed in said channel in abutting relationship with said front face of said first terminal holder when said cover member is in said covering position.

13. Connectors according to claim 9, wherein said cover member has a through hole aligned with one of said first light guides, and light-conducting means in said through hole for conducting light to the outside of said cover member to thereby enable determination if light is being conducted through said first optic cable when said cover member is in said covering position.

14. Connectors according to claim 13, wherein said light-conducting means comprises a material which is semi-transmissive of light.

15. A connector means adapted to be connected to a connector coupling for connecting two fiber optic cables, said connector means comprising a fiber optic cable having a light-emitting end portion which includes a plurality of light guides each having a light-emitting end, a terminal holder having a front face and a plurality of spaced openings for receiving said light guides such that said light-emitting ends are flush with said front face, a connector ring means having a channel with side walls and a bottom wall, said terminal holder being disposed in said channel such that said terminal holder abuts said bottom wall, said channel having a length greater than the length of said terminal holder so as to define a space in said channel juxtaposed to said front face of said terminal holder, and a cover means disposed in said space for preventing light rays from emitting from said light-emitting ends of said light guides, whereby said cover means is used when the connector means is not connected to said connector coupling and said cover means is removed from said connector ring means when said connector ring means is to be connected to said connector coupling.

16. A connector according to claim 15, wherein said cover means abuts said front face of said terminal holder.

17. A connector according to claim 15, wherein said cover means comprises reflecting means for reflecting light rays back into said fiber optic cable.

18. A connector according to claim 15, wherein said terminal holder has locating pins extending from said first face, said cover means having recesses for receiving said locating pins.

19. A connector according to claim 15, wherein said cover means has a through hole aligned with one of said light guides, and light-conducting means in said through hole for conducting light to the outside of said cover to thereby enable determination if light is being conducted through said optic cable.

* * * * *